(12) United States Patent
Amir et al.

(10) Patent No.: US 7,123,697 B2
(45) Date of Patent: Oct. 17, 2006

(54) METHOD AND SYSTEM FOR PROVIDING A CALL ANSWERING SERVICE BETWEEN A SOURCE TELEPHONE AND A TARGET TELEPHONE

(75) Inventors: Ofir Amir, Tel Aviv (IL); Nadav Ramati, Modi'in (IL)

(73) Assignee: Comverse Ltd., Tel Aviv (IL)

( * ) Notice: Subject to any disclaimer, the term of this patent is extended or adjusted under 35 U.S.C. 154(b) by 173 days.

(21) Appl. No.: 10/786,393

(22) Filed: Feb. 26, 2004

(65) Prior Publication Data

US 2005/0152515 A1 Jul. 14, 2005

Related U.S. Application Data

(60) Provisional application No. 60/536,241, filed on Jan. 14, 2004.

(51) Int. Cl.
*H04M 1/64* (2006.01)
(52) U.S. Cl. .................. 379/88.17; 379/88.25
(58) Field of Classification Search ............ 379/88.17, 379/88.23, 88.25
See application file for complete search history.

(56) References Cited

U.S. PATENT DOCUMENTS

| 5,450,488 | A | * | 9/1995 | Pugaczewski et al. ..... 379/67.1 |
| 6,031,896 | A | * | 2/2000 | Gardell et al. ........... 379/88.17 |
| 6,243,374 | B1 | * | 6/2001 | White et al. ................ 370/352 |
| 6,310,939 | B1 | * | 10/2001 | Varney .................... 379/88.01 |
| 6,337,898 | B1 | * | 1/2002 | Gordon .................... 379/67.1 |

* cited by examiner

*Primary Examiner*—Fan Tsang
*Assistant Examiner*—Simon Sing
(74) *Attorney, Agent, or Firm*—Sughrue Mion, PLLC

(57) ABSTRACT

In a method and voice mail system for providing a call answering service between a source telephone and a target telephone, a voice mail system receives an unanswered call directed to the target telephone. If the target telephone is not busy, the voice mail system establishes an outgoing call to the target telephone and conveys to the source telephone a response having embedded media parameters identifying media ports of the voice mail system. In response to an accept call instruction received from the target telephone, the voice mail system terminates the response and bridges all media between the source telephone and the target telephone.

19 Claims, 10 Drawing Sheets

METHOD AND SYSTEM FOR PROVIDING A CALL ANSWERING SERVICE BETWEEN A SOURCE TELEPHONE AND A TARGET TELEPHONE

The present application claims the benefit of U.S. provisional patent application 60/536,241 filed on Jan. 14, 2004 and entitled "Method and System for Providing a Call Answering Service between a Source Telephone and a Target Telephone", the disclosure of which is incorporated by reference in its entirety.

FIELD OF THE INVENTION

This invention relates to call screening by allowing a called party to filter incoming calls by hearing a caller's voice as the caller leaves a message and then deciding whether to break into a normal conversation with the caller or let the caller finish recording the message.

BACKGROUND OF THE INVENTION

The absence of call screening in network-based voicemail systems constitutes one of the biggest hindrances to the penetration of such systems into US and other markets. Call screening and visual Message Waiting Indicator (MWI via blinking light) are two of the biggest Telephone Answering Machine (TAM) selling features that are generally unavailable through network-based voicemail. Telephone handsets and answering machines at customer premises have traditionally provided these features. A common solution in US markets is to use a Telephone Answering Machine on location (i.e., at home, in the office, etc.), to provide such capabilities. Although network-based voicemail provides many advantages over location-based TAMs, network-based voicemail does not easily provide these two vital capabilities. This causes many subscribers in these markets to prefer home-located TAMs to network-based voicemail, despite other limitations of these TAMs. This technological gap causes network operators to lose potential voicemail air time, and it leaves subscribers with limited functionality.

U.S. Pat. No. 6,310,939 issued Oct. 30, 2001 assigned to Lucent Technologies, Inc. and entitled "Method and apparatus for screening a call as the call is transmitted to voice mail" discloses a screening and monitoring capability for switch based voice messaging systems that allows a called party to hear the caller's voice as the caller leaves a message and to break in to start a normal telephone discussion if the caller or the caller's subject warrants such action. A network service feature is provided that controls the bridging of the connections to the voice mail and the called party's telephone station. The service feature turns the voice mail off and destroys the connection if the monitoring called party speaks.

The approach disclosed in U.S. Pat. No. 6,310,939, incorporated herein by reference, is described only in relation to PSTN networks. However, PSTN network switch-based solutions have the following disadvantages:

Complexity: They require Advanced Intelligent Network Capabilities from the switch. These are not necessary supported by all switches.

Each switch might have its own implementation, so a user might have different user experiences using different switches.

Also in order to provide this service, the telephony switch must use two telephony ports for the whole duration of the call.

U.S. Pat. No. 6,353,660 (Burger et al.) issued Mar. 5, 2002, assigned to SS8 Networks, Inc. and entitled "Voice call processing methods" discloses a call screening method that allows a subscriber to screen calls made to the subscriber from callers using the PSTN while the subscriber may use another communications medium, such as VoIP. An enhanced services platform (ESP) receives a first call from a caller using a particular public telephone number for the particular subscriber. The ESP identifies the particular public telephone number for the particular subscriber. The ESP accesses a database storing a public telephone number and a private packet-based address for subscribers to retrieve a private packet-based address of the particular subscriber on the basis of the particular public telephone number. An introductory message is provided to the caller and prompts the caller to leave a message. The ESP accesses the particular subscriber based on the particular subscriber private packet-based address to establish an audio connection via the communication medium. The subscriber is notified of the first call. If the subscriber answers the call, a communication path is provided between the caller and the subscriber via the communication medium so that the subscriber may hear the caller leave the message but the caller does not hear or know that the particular subscriber is listening. The ESP connects the caller and the subscriber for two-way communication upon the authorization of the subscriber. In another embodiment, both the caller and the subscriber use a packet-based network. The ESP may also record the caller's voice in response to the prompt, and play the recording to the subscriber if the subscriber answers the call.

The system disclosed in U.S. Pat. No. 6,353,660, incorporated herein by reference, operates via PSTN switches. Screening is done not by voice of source subscriber but rather by predetermined criteria such as source ID as accessed from a database that correlates a public (PSTN) telephone number with an IP address. As explained with reference to FIG. 7 of U.S. Pat. No. 6,353,660, the called party may have a designated voice mail system but this serves the sole purpose of recording a message from the calling party only in the event that the called party does not answer an incoming call or rejects it. Thus, the voice mail is provided only for redirecting calls without contacting the called party first (mainly according to the time of the call/business hours). Screening is not performed by the voice mail system but rather by the ESP, which vocalizes a message prompt that is routed to the source. But in order to prompt the target telephone, the ESP must also call the target telephone. Even if a special tone or ringing signal is used that identifies the new call as originating from the ESP, the target subscriber must still answer the call in order to hear the message recorded by the source subscriber. Thus, from the perspective of the called subscriber, until he or she answers the incoming call, there is no way of knowing the identity of the calling party. This means, that the called subscriber will be disturbed to the extent of answering the telephone merely in order to ascertain the identity of the calling party. This is inconvenient even in the event that it transpires that connection to the calling party is required; but if, in fact, no such connection is required the interruption is all the more undesirable.

U.S. Pat. No. 5,625,676 published Apr. 29, 1997 assigned to Active Voice Corporation and entitled "Method and apparatus for monitoring a caller's name while using a telephone" discloses a method and apparatus for an auto attendant system to allow a called party to monitor a screening name left by a caller while the called party is on the telephone with a third party. If the called party wishes, the system can place the third party on hold and connect the caller. Alternatively, the system can redirect the caller to another line or ask the caller to hold. The system is implemented with a second communication channel from the telephone switch system to the called party so that the called party can monitor the screening name left by a caller without first putting the third party on hold or disconnecting from the third party. The system can be configured to automatically monitor each screening name as it is left, without intervention by the called party.

The system disclosed in U.S. Pat. No. 5,625,676, incorporated herein by reference, uses a data network in addition to the regular PSTN and stores voice messages in a server connected to the data network. In one embodiment, all incoming calls are screened and an interactive voice response prompts the calling party to state his or her name. This analog voice information is routed via the regular telephone line to the server where it is converted to data and conveyed to a computer for display thereby. The computer is typically located alongside the called party's POTS telephone extension, so as to allow the called party to see the identity of the calling party and thus decide how to react.

This system also relates to communication initiated in a regular PSTN. The system fails to provide automatic voice screening in an IP LAN where both calling and called parties communicate using VoIP. Moreover, the server operates as a voice mail system and the system is not adapted to extend the utility of a conventional voice mail system for use with VoIP. Also, the called party requires a separate computer to monitor an incoming call and this renders such an approach expensive since each user requires a dedicated computer.

Our co-pending U.S. application Ser. No. 10/739,196 entitled "Method and apparatus for providing a Central Telephony Service for a Calling Party at the Called Party telephone" incorporated herein discloses an improved telephone handset that may be used in a voice mail system in order for the target telephone to achieve two media-related operations:

Bridging the voice stream between a calling party and the voice mail; and

Summation of both bridged streams into one stream which is sent to the target telephone's speaker.

Such an approach is suitable for use with POTS or VoIP telephones or any combination thereof and obviates the need to modify the voice mail system, although it requires a modified telephone handset for use with such a system.

It would therefore be desirable to allow a voice mail system to operate in conjunction with any telephone network, including VoIP networks, so as to provide call screening and answering without the need for a modified telephone handset.

SUMMARY OF THE INVENTION

It is a principal object of the present invention to allow a voice mail system to provide a call screening/answering service between a source telephone and a target telephone.

It is a particular object of the invention to provide a system and method that allow an existing voice mail system to provide call screening in a VoIP telephone system without requiring modification to the telephone handsets or to the voice mail system.

It is a further object of the invention to provide a system and method that allow an existing voice mail system to provide call screening in wireless Packet Switch telephony systems, such as 3GPP IMS, without requiring modification to the telephone handsets or to the voice mail system.

These objectives are realized in accordance with a first embodiment of the invention by a method for providing a call answering service between a source telephone and a target telephone having access to a voice mail system, said method comprising:

(a) receiving an unanswered call directed to the target telephone, said call having embedded therein an address of the target telephone, an address of the source telephone, an address of the voice mail system, and an indication as to whether or not the target telephone is busy;

(b) if the target telephone is not busy, establishing an outgoing call to the target telephone;

(c) conveying to the source telephone a response generated by the voice mail system, said response having embedded media parameters identifying the voice mail system; and (d) in response to an accept call instruction received from the target telephone, terminating said response and bridging all media between the source telephone and the target telephone.

According to a second embodiment of the invention there is provided a method for providing a call answering service between a source telephone and a target telephone having access to a screening server, said method comprising:

(a) receiving an unanswered call directed to the target telephone, said call having embedded therein an address of the target telephone, an address of the source telephone, and an address of the screening server;

(b) establishing an outgoing call to the target telephone;

(c) establishing an outgoing call to a voice mail system and forwarding all call parameters that are needed by the voice mail system in order to process the call properly;

(d) conveying to the source telephone a response generated by the voice mail system, said response having embedded media parameters identifying the screening server; and (e) in response to an accept call instruction received from the target telephone, terminating said response and re-establishing connection to both the source telephone and the target telephone.

According to a third embodiment of the invention there is provided a method for providing an enhanced call answering service between a source telephone and a target telephone having access to a Value Added Service, said method comprising:

(a) receiving an unanswered call directed to the target telephone;

(b) establishing to the Value Added Service an outgoing call containing an address of the target telephone, an address of the source telephone, and an address of the Value Added Service;

(c) establishing an outgoing call to the target telephone;

(d) conveying to the source telephone a response generated by the Value Added Service, said response having embedded media parameters identifying the Value Added Service;

(e) directing media received from the source telephone to the Value Added Service and directing media received from the Value Added Service to the source telephone;

(f) upon the target telephone going off-hook, establishing a connection between the target telephone and the Value Added Service so as to allow the target telephone to receive media conveyed from the source telephone to the Value Added Service as well as media conveyed from the Value Added Service to the source telephone; and (g) in response to an accept call instruction received from the target telephone, routing all media between the source telephone and the target telephone.

In the third embodiment, instead of the Value Added Service, an intermediary associated with the Value Added Service may be used.

BRIEF DESCRIPTION OF THE DRAWINGS

Preferred embodiments will now be described, by way of non-limiting examples only, with reference to the accompanying drawings, in which.

DETAILED DESCRIPTION OF THE PREFERRED EMBODIMENTS

Figure 1:
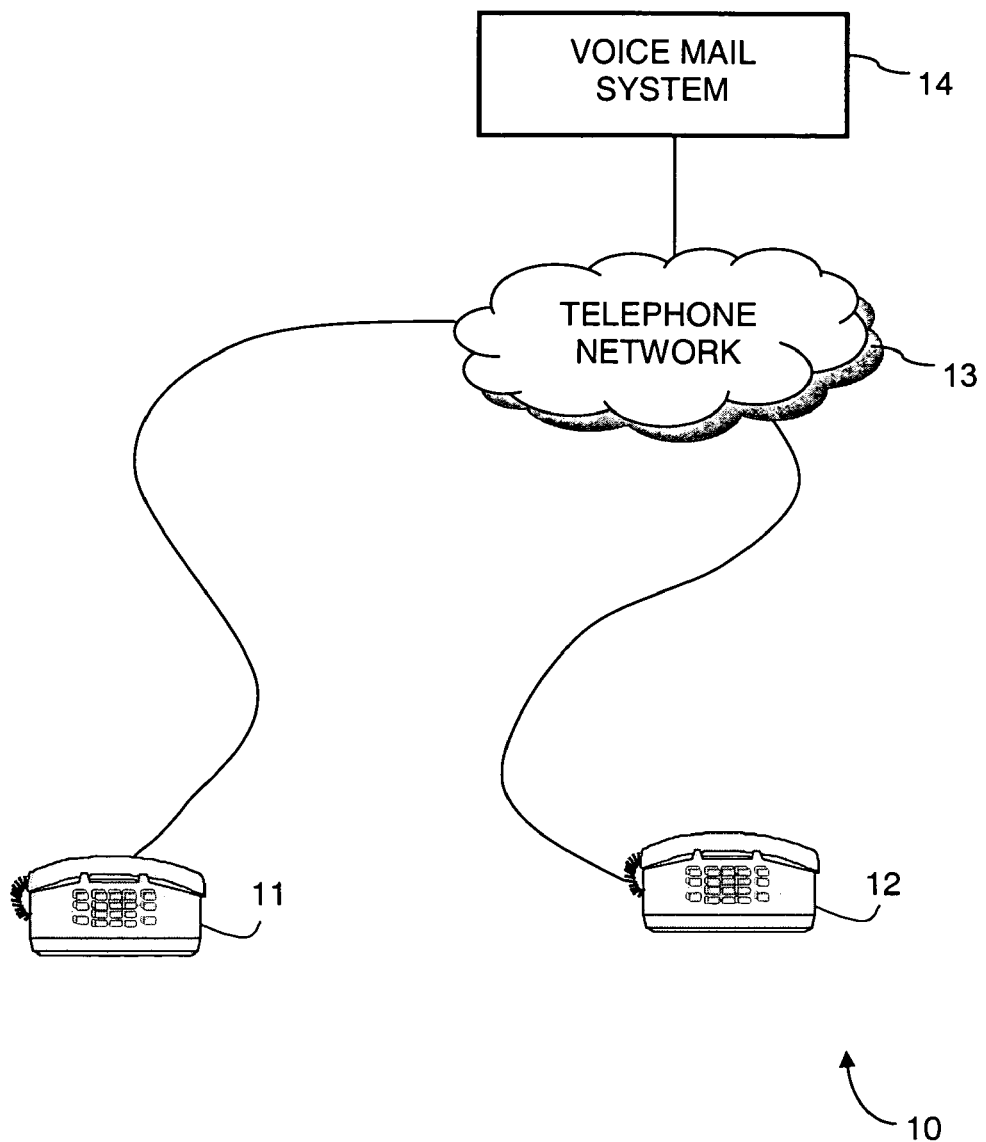
FIG. 1 is a pictorial representation of a system according to one embodiment for providing a call answering service between a source telephone and a target telephone.

FIG. 1 shows pictorially a system 10 according to one embodiment for providing a call answering service between a source telephone 11 and a target telephone 12 interconnected via a telephone network 13 and having access to a voice mail system (VMS) 14.

Figure 2:
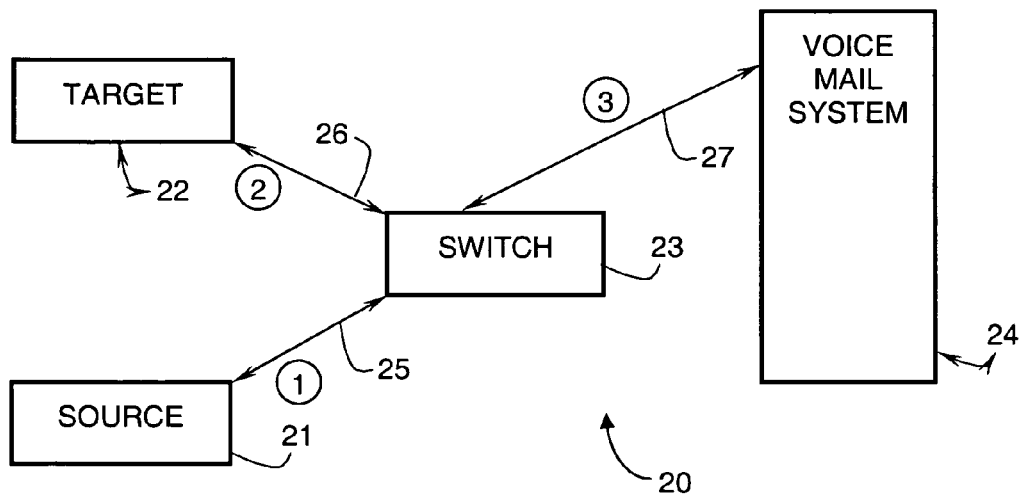
FIGS. 2 and 3 are block diagrams showing data flow in the system of FIG. 1 according to alternative embodiments.

FIG. 2 is a block diagram showing a system depicted 20 having a source telephone 21 and a target telephone 22 interconnected via a switch 23 that is also connected to a voice mail system 24. The system in FIG. 2 will be described in connection with sequential operations 1–3. In use, the source telephone 21 initiates a call to the target telephone 22 via a channel 25. The switch 23 conveys the call to the target telephone 22 via an incoming channel 26. If the call is not answered within a prescribed time, the switch 23 redirects the call to the voice mail system 24 via a channel 27, while disconnecting the connection to the target telephone 22. To this end, there is embedded within the call message an address of the target telephone, an address of the source telephone, and an address of the voice mail system. Typically, when SS7 protocol is employed, the addresses are telephone numbers but may be any other identity that uniquely addresses the target telephone, the source telephone, and the voice mail system depending on the message protocol. Any telephony signaling protocol such as SS7 or SIP employs an addressing system in order to identify the origination of the call and its destination. In SS7 this address is simply the telephone number which is embedded in the SS7 messages as binary data. SIP uses a more complex scheme, one that is more similar to an email address i.e. phonenumber@hostname, which is embedded as a simple human readable string in the SIP message. The voice mail system 24 answers the re-directed call so as to allow a message prompt to be conveyed from the voice mail system 24 to the source telephone 21 and to allow a voice message to be recorded by a user of the source telephone 21 and conveyed to the voice mail system 24 for storage thereby. Any message recorded by the calling party is conveyed via the channels 25 and 27 through the switch 23 to the voice mail system 24. The voice mail system 24 further initiates a call to the target telephone 22 via the channel 26 (which is no longer occupied) using the target telephone's address as received in the re-directed call so as to alert the target telephone of an incoming call. In the case that the target telephone 22 is a "smart" telephone, a special call prompt may be used, such as a characteristic ring signal and/or a flashing light that indicates the call as emanating from the voice mail system 24. This alerts the called party that the incoming call is a recorded voice mail message. The called party can lift the receiver so as to hear the message or ignore the incoming call and instead log in later to the voice mail system and listen to the recorded message at a more convenient time. Alternatively, the target telephone 22 may go off-hook automatically after a predetermined number of ring signals similar to a regular answer-phone. In either case, the target telephone 22 goes off-hook in order that the message recorded by the calling party may be conveyed to the target telephone 22 by the voice mail system 24. Consequently, if the called party is present and simply did not answer the call for any reason, he or she will now hear the recorded message and thus identify the calling party. The called party can answer the call by pressing a predetermined smart key combination (e.g. #4) so as to send a DTMF signal to the voice mail system 24, in which case the voice mail system 24 interrupts the message recorded from the source telephone 21 and bridges the voice streams between the source telephone 21 and the target telephone 22 via the switch 23. The voice streams are bridged on channel 27, such that the source and target voice streams are routed along a common media channel so as to be heard by both parties, and transmitted on channels 25 and 26 to the target telephone and source telephone respectively.

The system 20 shown in FIG. 2 is suitable when either or both of the source and target telephones operate over the PSTN where both data and control signals are routed together via a trunk switch, since in such case media cannot be redirected to a different endpoint after the call was answered without redirecting the signaling also. This requires that the media stream between the source and target telephones be bridged by the voice mail system and this, in turn, requires that the voice mail system be customized to allow for such bridging between the two media streams. In this context, the term "media stream" refers to the collection of digital data over time that represents the media/voice in digital telephony networks. However, in the case where both the source and target telephones operate under VoIP, media can be redirected to different endpoints after the call was answered and this permits signaling between the source and target telephones to be "bridged" via a screening server (constituting an intermediary), while allowing for the media to be routed directly between the source and target telephones after the called party selected to receive the call. In either case, the switching between the incoming and outgoing channels is typically implemented in software, although of course, suitably activated hardware components may be used.

Figure 3:
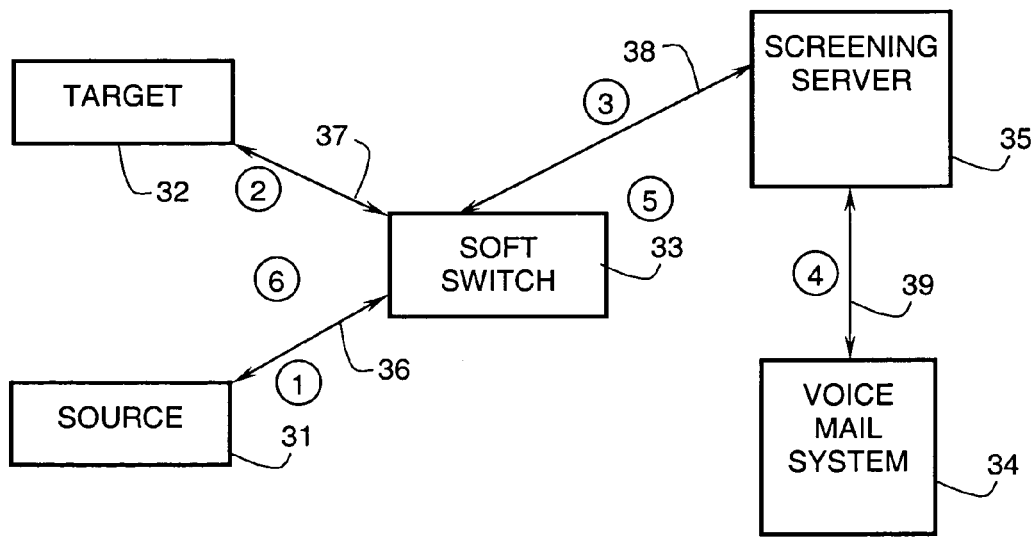

FIG. 3 is a block diagram showing such a system depicted 30 having a source telephone 31 and a target telephone 32 both operating under VoIP and interconnected via a soft proxy 33, also referred to as a soft switch, which is connected to a voice mail system 34 via a screening server 35. The system in FIG. 3 will be described in connection with sequential operations 1–6. In use, the source telephone 31 initiates a call to the target telephone 32 via a channel 36. The switch 33 conveys the call to the target telephone 32 via a channel 37. If the call is not answered within a prescribed time, the switch 33 redirects the call to the screening server 35 via a channel 38, while disconnecting the connection to the target telephone 32. To this end, there is embedded within the call message an address of the target telephone, an address of the source telephone, and an address of the screening server. The screening server 35 initiates a call to the voice mail system 34 via a channel 39 and also, via the soft switch 33, to the target telephone 32.

It is to be noted that in FIG. 3, the channels show only the signaling and the media connections are not shown. The media connections are: target<−>source, target<−>screening server, source<−>screening server, voicemail<−>screening server and in a VoIP network are different from the signaling connections. Thus, when the telephone call is set up, as is described in greater detail below with reference to FIGS. 7 and 10 of the drawings, the source telephone 31 sends an INVITE signal to the target telephone 32 via the soft proxy 33 shown in FIG. 3. Generally, the source telephone 31 does not know the IP address of the target telephone 32 and the INVITE includes an alias or name of the target telephone similar to a URL. The INVITE signal is sent via the soft proxy 33, which determines the IP address of the target telephone 32 in much the same way that a domain server finds the IP address of a website. The INVITE signal is routed by the soft proxy 33 to the target telephone 32, which responds with a 200 OK signal when using the Session Initiation Protocol (SIP) shown in FIGS. 7 and 10. The 200 OK signal includes the IP address of the target. Consequently, when the 200 OK signal reaches the source telephone 31, the latter now knows the IP address of the target telephone 32 and so is able to direct voice data packets directly to the target telephone and, of course, to receive voice data packets directly therefrom, without any need for these voice data packets to be conveyed via the soft proxy 33. It is in this sense that media is conveyed directly between two IP addresses in a VoIP network as distinct from the PSTN where media is conveyed between two end-points via the trunk switch.

The voice mail system 34 answers the re-directed call so as to allow a message prompt to be conveyed from the voice mail system 34 to the screening server 35 and from there to the source telephone 31. In effect, this creates a voice channel between the voice mail system 34 and the source telephone 31 whereby a voice message recorded by the calling party may be conveyed to the voice mail system 34 for storage thereby. Any message recorded by the calling party is conveyed via the channels 36 and 38, the switch 33 and the screening server 35 to the voice mail system 34.

The screening server 35 further initiates a call to the target telephone 32 via the channel 37 (which is no longer occupied) using the target telephone's address as received in the re-directed call so as to alert the target telephone of an incoming call. If the target telephone 32 is a "smart" telephone, a special call prompt may be used, such as a characteristic ring signal and/or a flashing light that indicates to the called party that the call emanates from the voice mail system 34. This alerts the called party that the incoming call is a recorded voice mail message. The called party can lift the receiver so as to hear the message or ignore the incoming call and instead log in later to the voice mail system and listen to the recorded message at a more convenient time. Alternatively, the target telephone 32 may go off-hook automatically after a predetermined number of ring signals similar to a regular answer-phone. In either case, the target telephone 32 goes off-hook in order that the message recorded by the calling party may be conveyed to the target telephone 32 by the screening server 35 for rendering at the target telephone. Consequently, if the called party is present and simply did not answer the call for any reason, he or she will now hear the recorded message and thus identify the calling party. At the same time, the voice message is conveyed by the screening server 35 to the voice mail system 34 where it is stored in the normal manner. The called party can answer the call by pressing a predetermined smart key combination (e.g. #4) so as to send a predetermined DTMF signal to the screening server 35, which terminates the connection to the voice mail system 34 and re-establishes connection to the source telephone 31 and to the target telephone 32 via the switch 33. By such means, a voice (media) channel is established between the source telephone 31 and the target telephone 32, even though the signaling is conveyed via the screening server 35. As noted above, the ability to route the media via a different channel to the signaling is unique to VoIP and it is this feature that allows the introduction of an intermediary screening server, which avoids the need to make any changes to the voice mail system 34.

Figure 4:
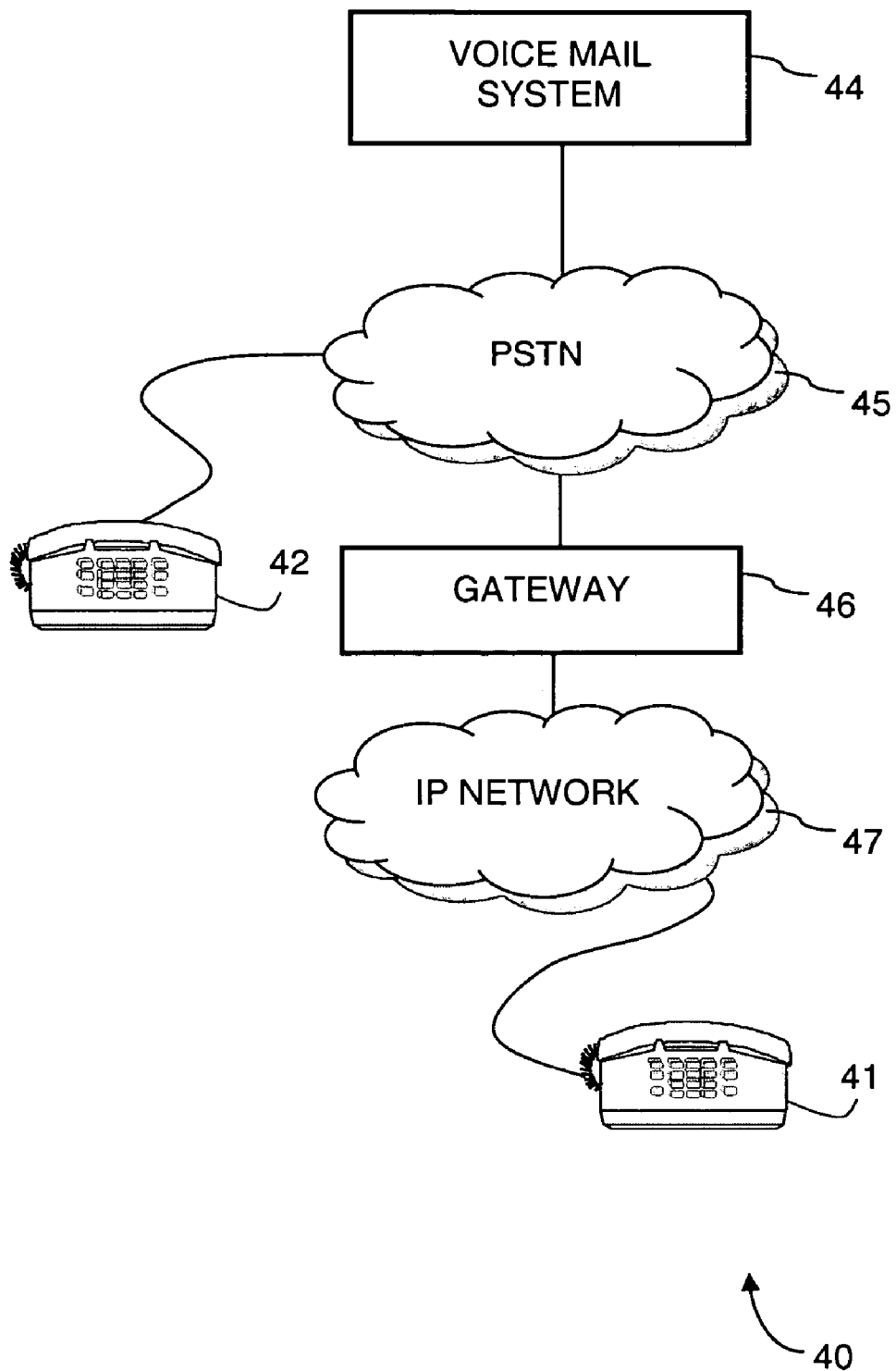
FIG. 4 is a pictorial representation of a hybrid system according to the invention for providing a call answering service between a VoIP source telephone and a PSTN target telephone or vice versa.

FIG. 4 is a pictorial representation of a hybrid system 40 for providing a call answering service between a VoIP source telephone 41 and a PSTN target telephone 42 coupled to a voice mail system 44 via a PSTN network 45 that is connected via a gateway 46 to an IP network 47. The PSTN network 45 includes a switch similar to the switch 23 shown in FIG. 2; and the IP network 47 includes a proxy switch similar to the soft proxy 33 shown in FIG. 3. Each of the PSTN network 45 and the IP network 47 operates in an identical manner to the respective networks described above with reference to FIGS. 2 and 3, respectively. Thus, the only substantive difference is that signaling and media are conveyed from one network to the other via the gateway 46, which operates in a manner well known in the art to convert the signals between PSTN and IP protocols and vice versa.

By way of example, so far as the IP network 47 is concerned, the gateway 46 functions as an intermediate target that receives signaling and media from the source telephone 41. In the IP network 47, the signaling and media are received together by the gateway 46 on the same path and allow connection to the target telephone 42 via the PSTN network 45. Since the voice mail system 44 is already part of the PSTN network 45, the switching between the voice mail system 44 and the target telephone 42 is as described with reference to the PSTN system 20 shown in FIG. 2. Likewise, the connection between the incoming and outgoing channels (not shown) of the target telephone 42 remains unchanged. However, the incoming channel is coupled to the source telephone 41 via the gateway. Thus, initially voice mail system 44 is re-directed via the target telephone 42 to the gateway 46, which in turn determines that the required destination is the source telephone 41 in the PSTN network 47. The gateway 46 receives the signaling and media on separate paths in the PSTN network 45, performs the required protocol conversion and re-directs the signaling and media on a common path in the IP network 47 to the source telephone.

It will readily be appreciated that the source telephone 41 and the target telephone 42 can be interchanged and the voice mail system may be part of either the PSTN network (as shown) or can be part of the IP network 47. If it is part of the IP network 47, then it may be coupled to the soft switch via a screening server as shown in FIG. 3. In either case, operation is similar to that described above with suitable protocol conversion being performed by the gateway so as to allow propagation of the signaling and media between the two networks.

Figure 5:
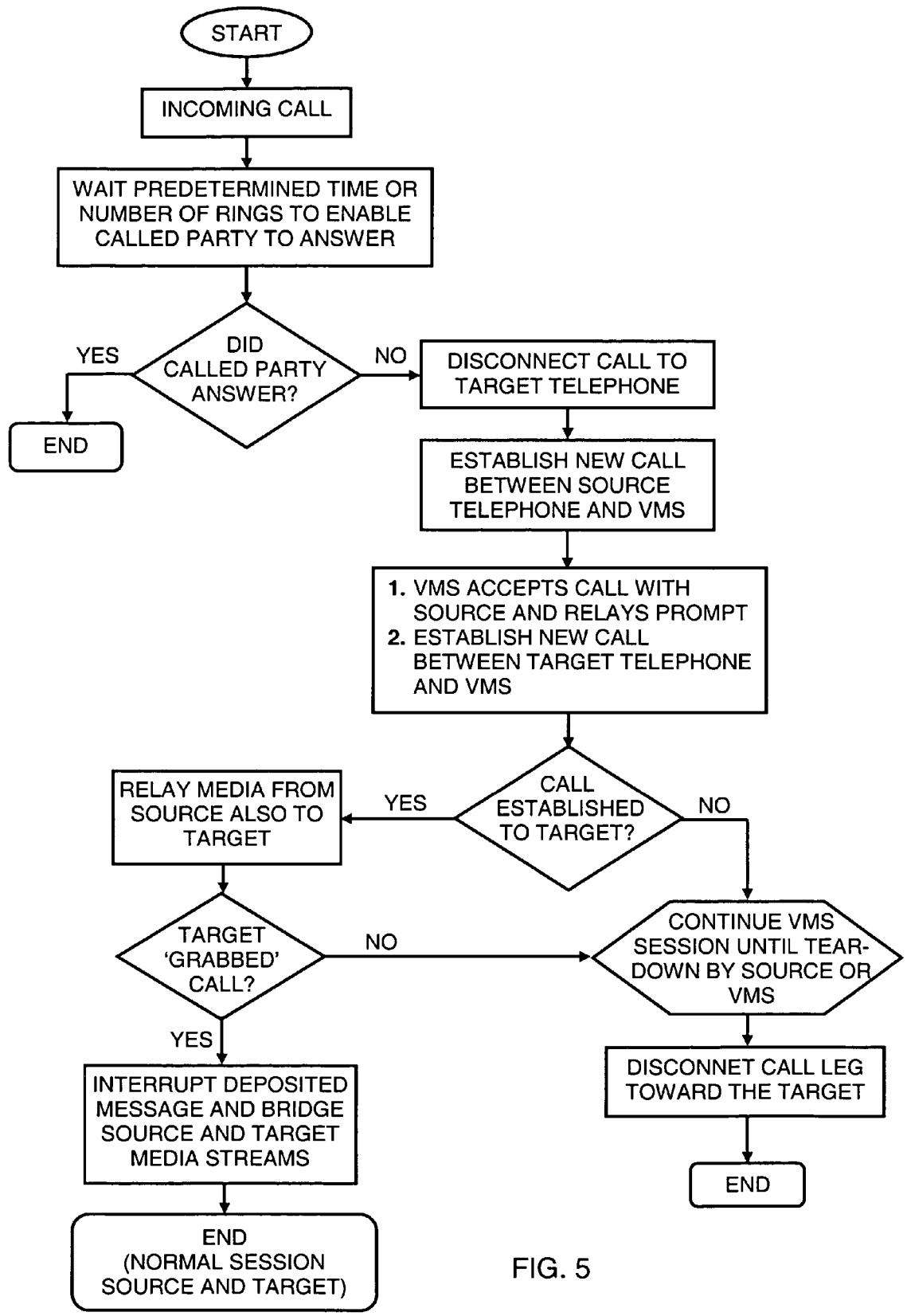
FIG. 5 is a flow diagram showing the principal operations carried out by the switch in the system of FIG. 2.

FIG. 5 is a flow diagram showing the principal operations carried out in the system of FIG. 2. Thus, on receipt of an incoming call, the switch 23 waits a predetermined time or number of rings to enable the called party to answer. If the called party answers within the prescribed time period, no further action is taken and normal operation of the target telephone continues. In the absence of an answer within the prescribed time period, the switch 23 disconnects the target telephone and establishes a connection to the voice mail system 24. By such means, the switch 23 connects the source telephone 21 to the voice mail system 24, thereby allowing the voice mail system 24 to convey a pre-recorded message to the source telephone and for the calling party to record a message in known manner. Upon receiving such a call, the voice mail system 24 establishes a connection to the target telephone 22, via the switch 23 thereby causing the target telephone 22 to ring and alert the called party of an incoming call. As noted above, if the target telephone 22 is a "smart" telephone, a special ring signal may be intoned so that the called party knows the origin of the incoming call. Upon establishment of the connection between the target telephone 22 and the voice mail system 24, the target telephone accepts the call (i.e. goes off-hook). This may be done automatically (e.g. after a prescribed number of rings) or manually by the called party. In either case, this causes the target telephone 22 to establish a voice connection to the voice mail system 24, whereby the called party now hears the message being recorded by the calling party, thus allowing the called party to screen the incoming call. If the called party grabs the call, by entering the appropriate DTMF signal, for example, the DTMF signal is conveyed, via the switch 23, to the voice mail system 24, which detects the DTMF signal, interrupts the message, and bridges the respective voice streams of the calling party and the called party, thus allowing them to converse in regular manner. The system may be configured to delete the message from the voice mail system or to keep the message for later playing.

If on the other hand the called party does not grab the call by entering the appropriate DTMF signal, for example, the calling party may continue to record a message to the voice mail system 24 until tear down (i.e. disconnection) by the calling party, resulting in disconnection of the target telephone 22 from the voice mail system 24. Termination of the recorded message by the calling party is typically signified by entry by the calling party of a special DTMF key combination, e.g. "#", although it may occur after a prescribed timeout. In any the case the called party can disconnect itself from the call without stopping the calling party from leaving the message in the VMS. It should be noted that in FIGS. 5 and 9b it is shown that if the target does not grab the call, the process terminates by disconnecting the call leg toward the target. This allows regular voice mail communication to continue between the calling party and the voice mail system, thus allowing the calling party to continue recording a message. But, as described above, if the target does grab the call, then the voice mail system 24 will hold two call legs which are actually part of a single call. In any case the called party can disconnect itself from the call without stopping the calling party from leaving the message in the voice mail system.

It is clear from the above description that the switch 23 must be programmed to carry out the functionality shown in FIG. 5. However, in addition to the described functionality of the switch 23, it is clear that the voice mail system 24 also requires customization in order to bridge the voice streams of the calling party and the called party.

Figure 6:
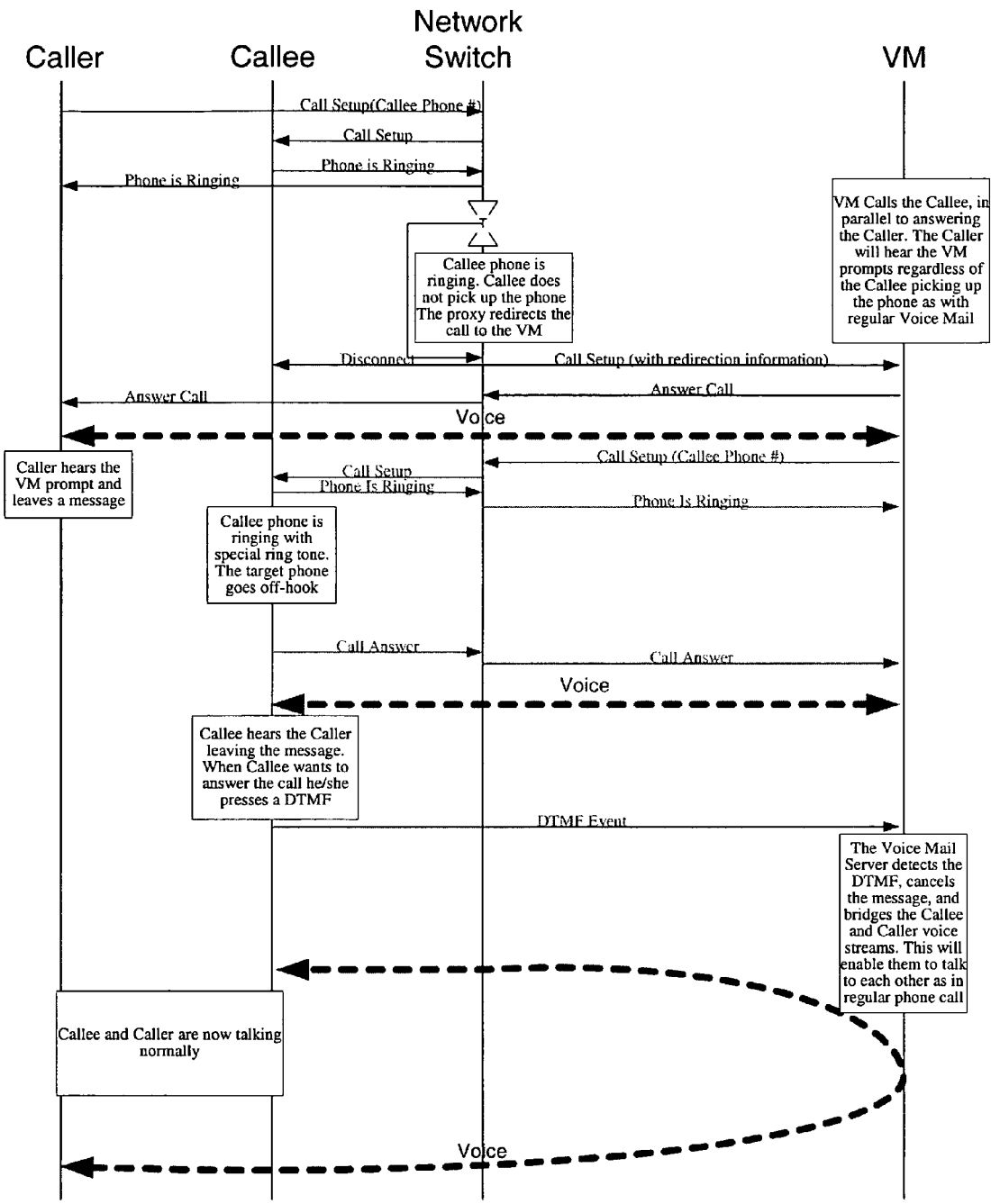
FIG. 6 is a schematic 'Call Flow' diagram showing signaling in the system of FIG. 2 using a network switch.
Figure 7:
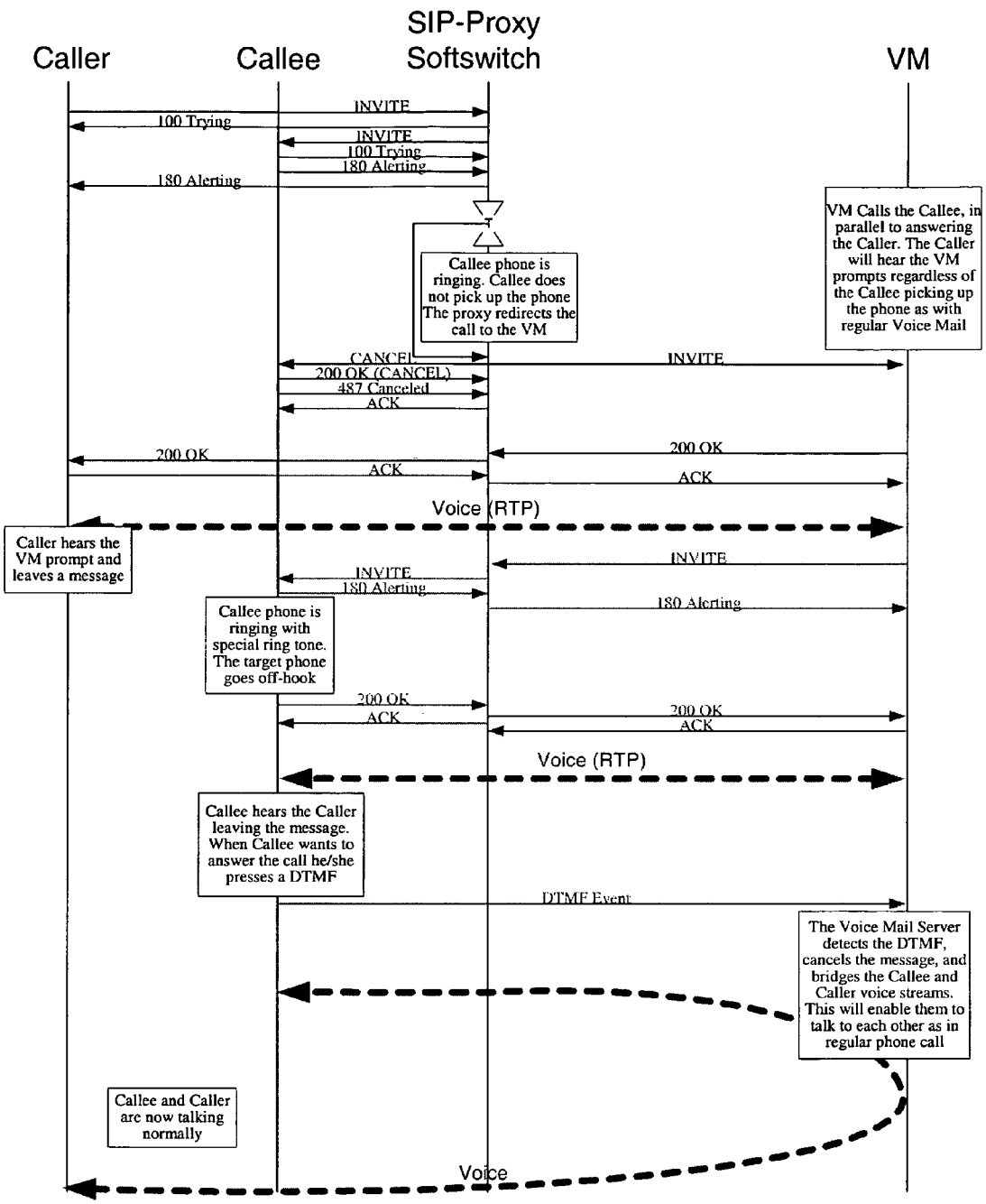
FIG. 7 is a schematic 'Call Flow' diagram showing signaling in the system of FIG. 2 using a soft switch according to the SIP protocol.
Figure 8:
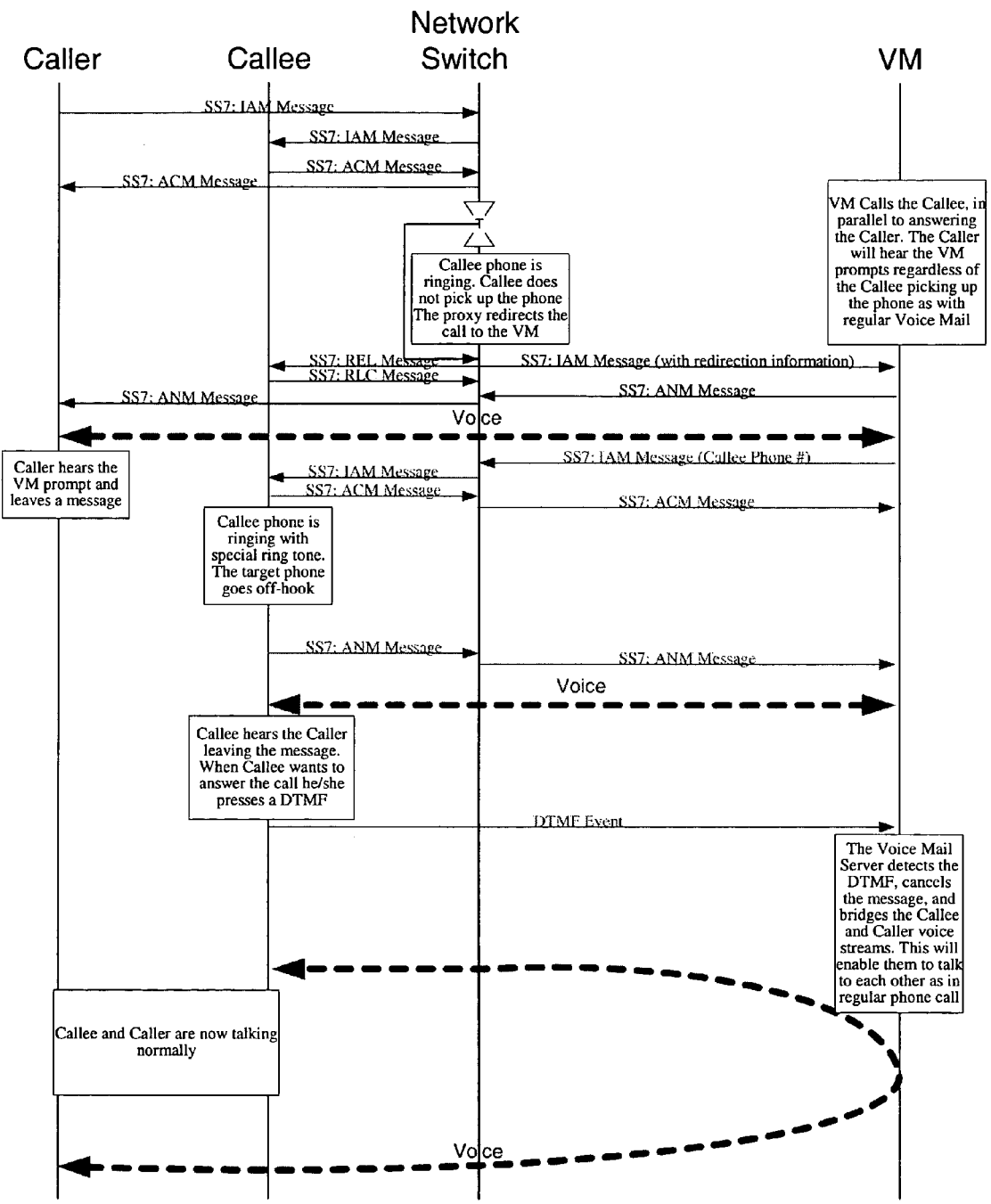
FIG. 8 is a schematic 'Call Flow' diagram showing signaling in the system of FIG. 2 using a network switch according to the SIP protocol.

FIGS. 6 to 8 are schematic 'Call Flow' diagrams showing signaling in the system of FIG. 2. FIG. 6 shows the required functionality independent of any particular protocol, while FIGS. 7 and 8, respectively, depict use of the Session Initiation Protocol (SIP) (the current edge of VoIP Telephony) and SS7 (the current PSTN standard). Specifically, FIG. 7 relates to a 3GPP IMS network or any other VoIP network. It will be understood that in the following description reference to VoIP is intended also to encompass 3GPP IMS. Thus, FIG. 7 shows how the voice mail system operates under VoIP in the same architecture as in the PSTN, thus demonstrating that the invention is valid for both PSTN and VoIP or a combination of both and makes clear that the architecture shown in FIG. 2 can be used with any combination of telephone networks while FIG. 3 requires that the network be a pure VoIP network. In all figures, each arrow represents a message exchanged between the parties. FIG. 6 depicts the functionality described in detail above with reference to FIG. 2 of the drawings and so will not be described further.

In FIG. 7 each message is a SIP message described in detail in the IETF RFC-3261 specification which is incorporated herein by reference. Thus, the calling party (denoted "caller") at the source telephone 21 calls the called party (denoted "callee") at the target telephone 22. The source telephone is a VoIP phone typically being a SIP application running on a PC that is used to call the target telephone 22 over the Internet. The target telephone 22 is also SIP-enabled. The source telephone 21 calls the target telephone 22 using the latter's SIP identity, a type of Uniform Resource Identifier (URI) called a SIP URI, having a form similar to an e-mail address.

SIP is based on a series of HTTP-like request/response transactions each consisting of a request that is directed to a server for invoking a particular method or function thereon and at least one response that is directed from the server to the initiating device. Thus, in FIG. 7, the source telephone sends the INVITE to the switch 23 that serves the target telephone's domain and which also operates under SIP. For simplicity, FIG. 7 omits the intermediate servers and shows only the principal actors in the connection: namely, the source and target telephones, the switch and the voice mail system, but it will be understood that the actual connections are effected via an intermediate switch (or more than one) as described above with reference to FIG. 4. In the case that one of the two telephones is VoIP the intermediate switch will be a soft proxy while in PSTN the intermediate switch is a Switch. The target telephone responds with a ringing signal denoted as 180 in the SIP protocol, which is sent back to the source telephone. When the requisite time has elapsed without the target telephone responding, the switch cancels the connection to the target telephone, which responds with the OK signal 200 and the 487 (Cancel) signal, which is acknowledged by the switch. At this point, the target telephone 22 is no longer an active party. The switch 23 now sends the INVITE signal to the voice mail system 24, which responds with the OK signal 200 and is acknowledged thereby by means of an ACK signal thus establishing voice connection between the source telephone 21 and the voice mail system 24. Upon termination of the message recorded by the calling party, the voice mail system 24 sends the INVITE signal via the switch 23 to the target telephone, which responds with the 180 altering signal confirming that the target telephone is ringing. When the target telephone goes off-hook, it sends the OK signal 200 via the switch 23 to the voice mail system 24, which acknowledges it by means of an ACK signal. At this point, voice communication is established between the source telephone 21 and the voice mail system 24 and also between the target telephone 22 and the voice mail system 24, as indicated by the respective chain-dotted voice streams in FIG. 7. This allows the called party to hear the calling party's message as it is conveyed to the voice mail system 24.

There are now two possible scenarios. A first scenario relates to the case where the called party at the target telephone is present when the call is made but uses the system to screen incoming calls, and now grabs the call. As noted above, this is done by means of a DTMF signal conveyed from the target telephone 22 to the voice mail system 24 via the switch 23. In this case the voice mail system 24 detects the DTMF signal, interrupts the message and bridges the respective voice streams of the calling party and the called party, thus allowing them to converse in regular manner. The system may be configured to delete the message from the voice mail system or to keep the message for later playing.

The Call flow diagrams shown in FIGS. 6, 7, 8 and 10 show the call flows until the connection is established and do not depict the scenario where the target telephone does not grab the call since it has no real implication on the actual service. Disconnecting the call correctly is a normal feature of any telephony service. Nevertheless, for the sake of completeness this scenario is now described.

Thus, in the second scenario, the called party at the target telephone does not grab the call, either because he or she is absent or because it is not convenient. In this case, the calling party records his message in the normal manner and then hangs up thereby sending a BYE signal to the target telephone, which in turn sends a BYE signal to the Voice Message System. The Voice Message System responds with the OK signal 200 to the target telephone and the target telephone responds with the OK signal 200 to the source telephone, thus denoting that the session is properly terminated.

FIG. 8 shows the equivalent behavior of the system when operating under the SS7 protocol. It will be seen that the functionality is identical to the SIP protocol and since the SS7 protocol is well known to those versed in the art no further description is required.

The embodiment described above with particular reference to FIGS. 2 and 5 to 8 of the drawings resides principally in an improved manner of controlling the voice mail system to achieve two media-related operations:

Bridging the voice stream between the calling party and the called party; and
Summation of both bridged streams into one stream which is sent to the target telephone's speaker.

Actually, these two operations share the same mechanism as is now described.

Bridging the Voice between two Parties

In order to bridge the voice between two parties, the voice mail system 24 needs to manipulate the incoming media streams from the two participants, and join them into one media stream. This is true for digital PSTN networks but not for VoIP networks where the need for such bridging is obviated by the provision of a separate screening server, and can be easily achieved for analog networks as well with simple modification that will be clear to those skilled in the art.

A media stream from the user (i.e. the voice from that user) is defined as a discrete-time sequence of values depicting the amplitude of the voice signal. In the case that the signal is compressed and/or packetized for delivery it should be de-compressed and/or de-packetized before the manipulation.

Assuming that the media stream from the calling party is represented by the sequence $\{a_1,a_2,a_3, \ldots \}$, and the media stream from the called party is represented by the sequence $\{b_1,b_2,b_3, \ldots \}$, the sum of these two streams is the summation of two corresponding elements of the streams: $\{a_1+b_1, a_2+b_2, a_3+b_3, \ldots \}$.

Multiplication of a stream with a constant is the multiplication of each element in the stream with a constant such as stream A multiplied by 2 is: $\{2 \cdot a1, 2 \cdot a2, 2 \cdot a3, \ldots \}$. Bridging of two media streams is the summation of the two media streams and the multiplication of the result by $$\frac{2}{\sqrt{2}}$$

in order to maintain the same signal energy.

Thus the result of bridging two media streams A & B is the following sequence:

$$\left\{ \frac{2}{\sqrt{2}}(a_1 + b_1), \frac{2}{\sqrt{2}}(a_2 + b_2), \frac{2}{\sqrt{2}}(a_3 + b_3) \ldots \right\}$$

Figure 9A:
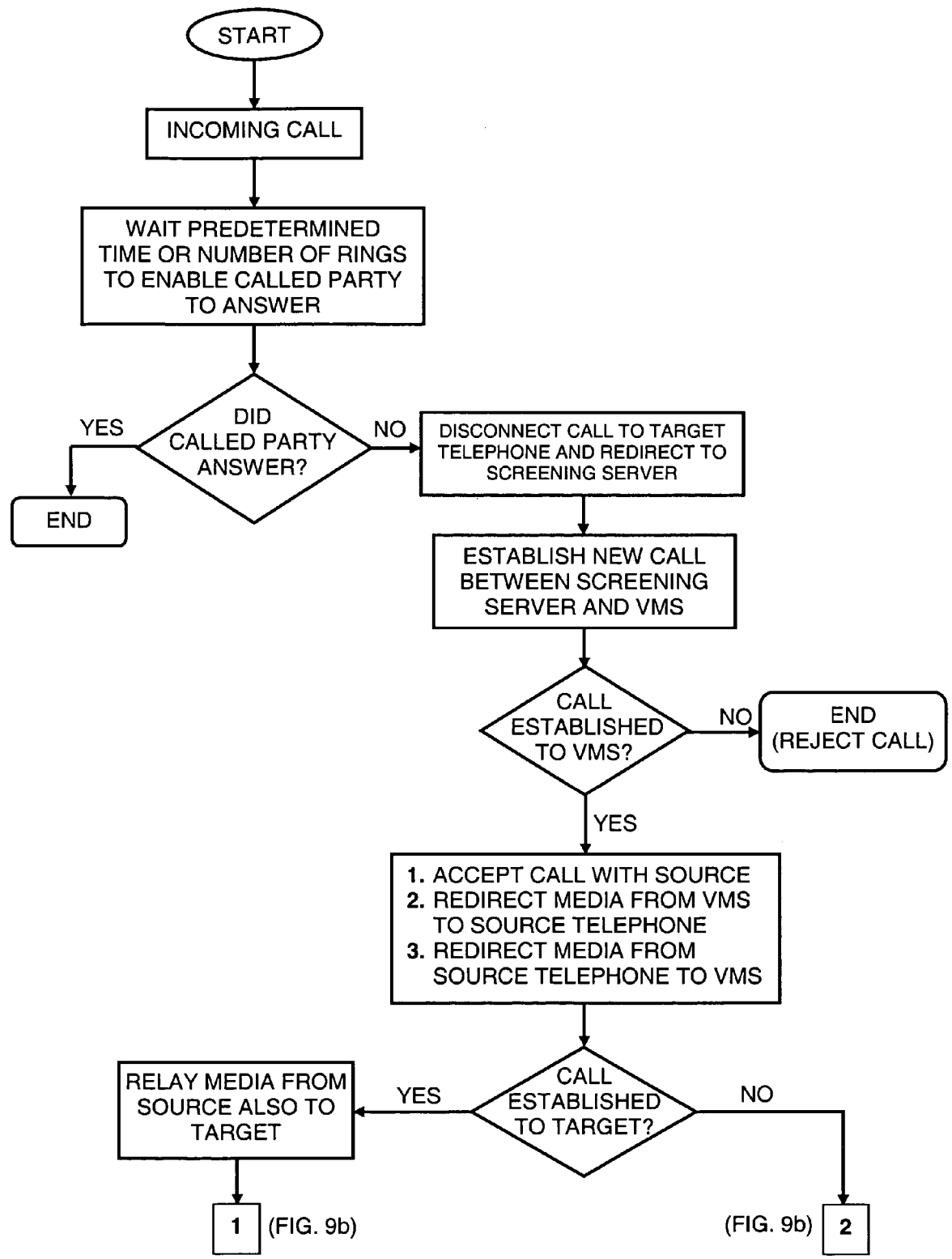
FIGS. 9a and 9b are flow diagrams showing the principal operations carried out by the soft switch in the system of FIG. 3.
Figure 9B:
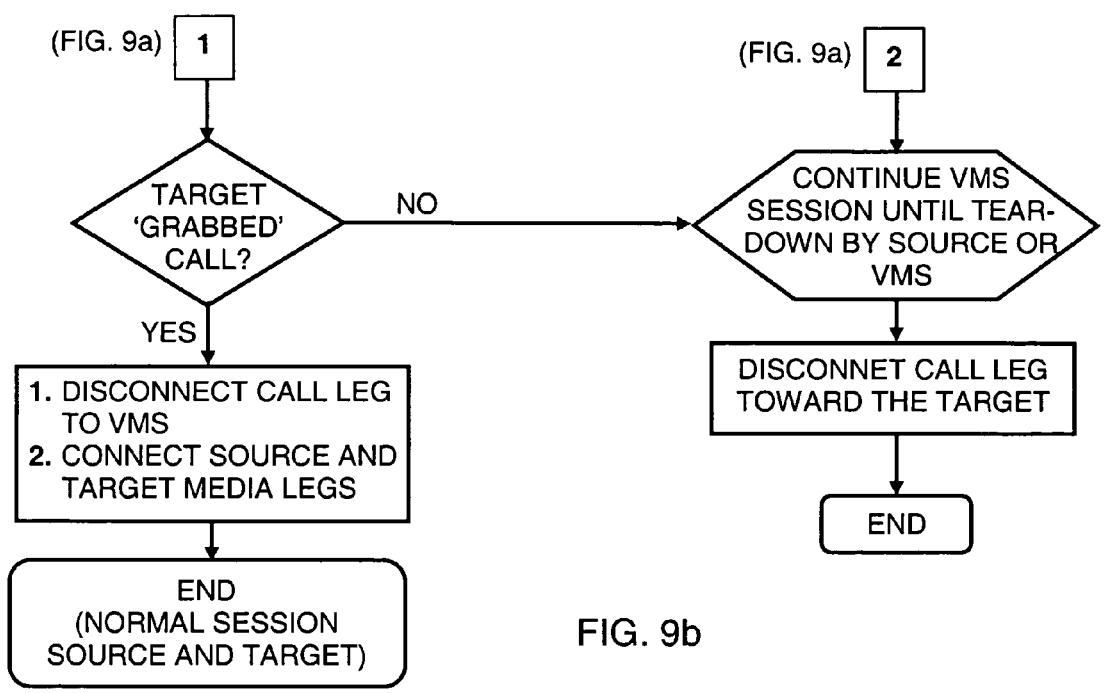

FIGS. 9a and 9b are a flow diagram showing the principal operations carried out in the system of FIG. 3. Thus, on receipt of an incoming call, the soft switch 33 waits a predetermined time or number of rings to enable the called party to answer. If the called party answers within the prescribed time period, no further action is taken and normal operation of the target telephone continues. In the absence of an answer within the prescribed time period, the soft switch 33 disconnects the target telephone and establishes a connection to the screening server 35, which establishes a connection to the voice mail system 34. By such means, voice communication is established between the source telephone 31 and the voice mail system 34 via the switch 23 and the screening server 35, thereby allowing the voice mail system 34 to convey a pre-recorded message to the source telephone and for the calling party to record a message in a known manner. Upon such a call, the screening server 35 establishes a connection to the target telephone 32, thereby causing the target telephone 32 to ring and alert the called party of an incoming call. As noted above, if the target telephone 32 is a "smart" telephone, a special ring signal may be intoned so that the called party knows the origin of the incoming call. Upon establishment of the connection between the target telephone 32 and the screening server 35, the target telephone accepts the call (i.e. goes off-hook). This may be done automatically (e.g. after a prescribed number of rings) or manually by the called party. In either case, this causes the target telephone 32 to establish a voice connection to the voice mail system 34 via the screening server 35, whereby the called party now hears the message being recorded by the calling party, thus allowing the called party to screen the incoming call.

If the called party grabs the call, by entering the appropriate DTMF signal, for example, the DTMF signal is conveyed, via the switch 33, to the screening server 35, which detects the DTMF signal, terminates the connection to the voice mail system 34 and re-establishes connection to the source telephone 31 and to the target telephone 32. By such means, voice connection is established between the source telephone 31 and the target telephone 32 thus allowing the calling party and the called party to converse in regular manner.

If on the other hand the called party does not grab the call by entering the appropriate DTMF signal, for example, the calling party may continue to record a message to the voice mail system 34 until tear down by the calling party, resulting in disconnection of the target telephone 32 from the screening server 35. Termination of the recorded message by the calling party is typically signified by entry by the calling party of a special DTMF key combination, e.g. "#", although it may occur after a prescribed timeout. In any the case the called party can disconnect itself from the call without stopping the calling party from leaving the message in the VMS.

Figure 10:
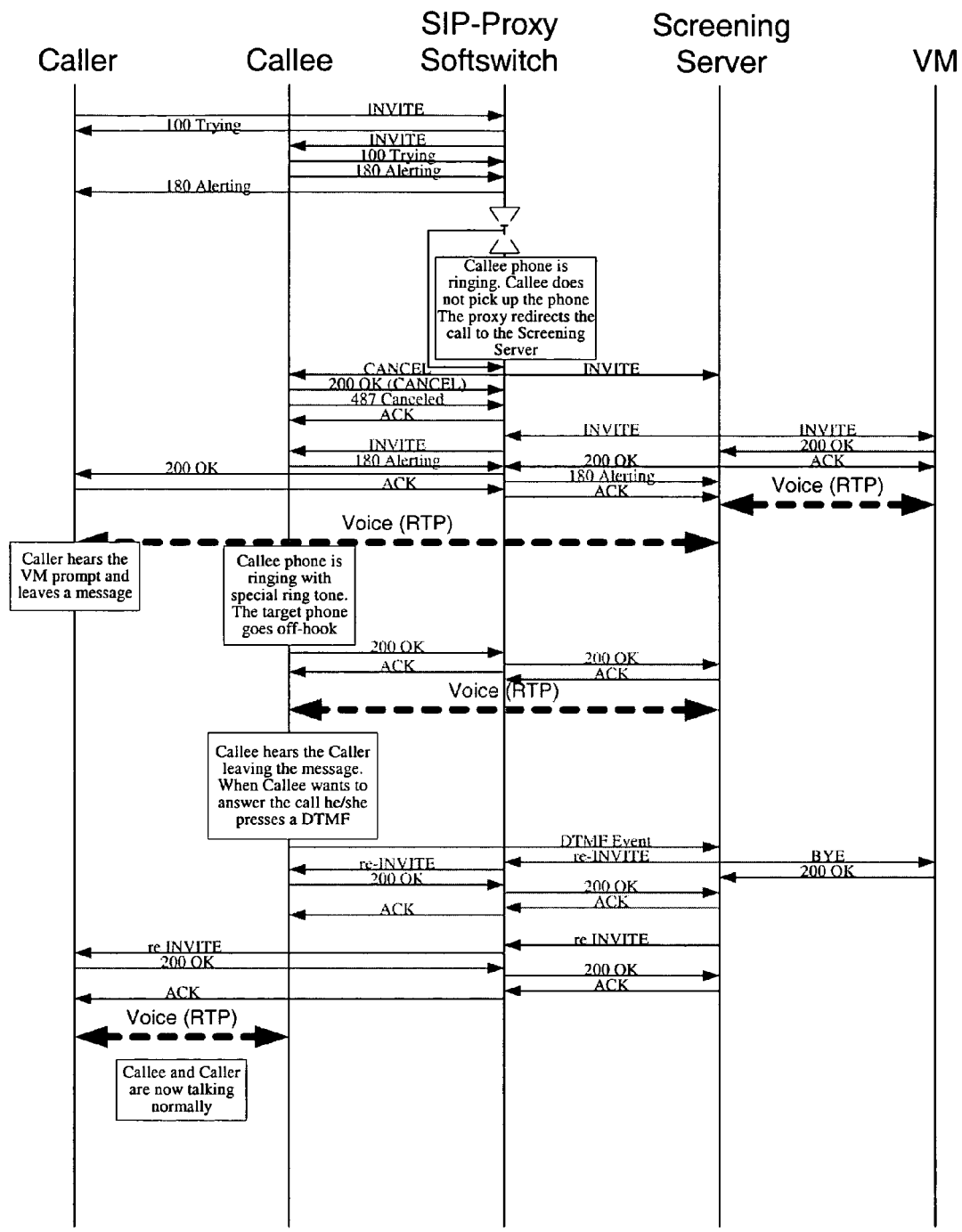
FIG. 10 is a schematic 'Call Flow' diagram showing signaling in the system of FIG. 3 using a soft switch according to the SIP protocol.

FIG. 10 is a schematic 'Call Flow' diagram showing signaling in the system of FIG. 3 using SIP. Thus, the calling party (denoted "caller") at the source telephone 31 calls the called party (denoted "callee") at the target telephone 32. The source telephone is a VoIP phone that is used to call the target telephone 32 over the IP Network. The target telephone 32 is also SIP-enabled. The source telephone 31 calls the target telephone 32 using the latter's SIP identity, a type of Uniform Resource Identifier (URI) called a SIP URI, having a form similar to an e-mail address.

Specifically, the source telephone sends the INVITE to the switch 33 that serves the target telephone's domain and which also operates under SIP. For simplicity, FIG. 10 omits the intermediate servers and shows only the principal actors in the connection: namely, the source and target telephones, the switch and the voice mail system, but it will be understood that the actual connections are effected via a proxy server (or more than one) as described above with reference to FIGS. 3 and 4. The target telephone responds with a ringing signal denoted as 180 in the SIP protocol, which is sent back to the source telephone. When the requisite time has elapsed without the target telephone responding, the switch cancels the connection to the target telephone, which responds with the OK signal 200 and the 487 (Cancel) signal, which is acknowledged by the switch. At this point, the target telephone 32 is no longer an active party. The switch 33 now sends the INVITE signal to the screening server 35, which in turn sends the INVITE signal to the voice mail system 34. The establishment of the call to the voice mail system 34 is a simple outgoing call although all call parameters that were received by the screening server 35 are forwarded correctly to the voice mail system 34. Both the screening server 35 and the voice mail system 34 respond to the respective INVITE signals with a respective OK signal 200, which are acknowledged by respective ACK signals thus establishing voice connection between the source telephone 31 and the voice mail system 34. Again, for the sake of completeness, although not shown in FIG. 10, it should be noted that upon termination of the message recorded by the calling party, the voice mail system 34 sends the INVITE signal via the screening server 35 and the switch 33 to the target telephone, which responds with the 180 alerting signal confirming that the target telephone is ringing. When the target telephone goes off-hook, it sends the OK signal 200 via the switch 33 to the screening server 35, each of which acknowledges the respective OK signal 200 by a respective ACK signal. At this point, voice communication is established between the source telephone 31 and the voice mail system 34 (via the screening server 35) and also between the target telephone 32 and the voice mail system 34 (via the screening server 35), as indicated by the respective chain-dotted voice streams in FIG. 10. This allows the called party to hear the calling party's message as it is conveyed to the voice mail system 34.

There are now two possible scenarios. A first scenario relates to the case where the called party at the target telephone is present when the call is made but uses the system to screen incoming calls, and now grabs the call. As noted above, this is done by means of a DTMF signal conveyed from the target telephone 32 to the voice mail system 34 via the switch 33 and the screening server 35. In this case the screening server 35 detects the DTMF signal, cancels the communication to the voice mail system 34 and sends a re-INVITE signal via the switch 33 to the target telephone 32. These signals are responded to in the usual way by 200 OK signals, which are acknowledged by ACK signals. In an identical manner, the screening server 35 sends a re-INVITE signal via the switch 33 to the source telephone 31. Again, these signals are responded to by 200 OK signals, which are acknowledged by ACK signals. By such means, the screening server 35 bridges the respective voice streams of the calling party and the called party, thus allowing them to converse in regular manner.

Likewise, for the sake of completeness, although not shown in FIG. 10, it should be noted that in the second scenario, the called party at the target telephone does not grab the call, either because he or she is absent or because it is not convenient. In this case, the calling party records his message in the normal manner and then hangs up thereby sending a BYE signal to the target telephone, which in turn sends a BYE signal to the Voice Message System via the switch 33 and the screening server 35. The Voice Message System responds with the OK signal 200 to the target telephone and the target telephone responds with the OK signal 200 to the source telephone, thus denoting that the session is properly terminated.

It should also be noted that calls to users that are provisioned only with a voice mail service and not with the screening service will be redirected to the voice mail server directly. This is an existing functionality of switches to redirect calls according to service provisioned to specific users and so does not require further explanation.

It will also be appreciated that while the invention has been described with particular regard to the provision of audio prompts and messages, no limitation is implied and the telephone service may operate to convey other types of real-time data such as video, text and so on as well as any combination thereof. For example, in the case of video, instead of a voice mail system, a video mail system could be employed.

It should also be noted that while the system depicted in FIGS. 2 and 3 have been described with particular regard to a voice mail system, the invention encompasses other systems that may be provided with added value via an intermediate server. By way of example only, the voice mail system may be a voice-to-text processor that is adapted either on its own or in conjunction with an intermediate server to process a voice message and convert it to text, which is then conveyed to the called party via SMS. Likewise, the invention has broader application than the screening server shown in FIG. 3 used to screen messages conveyed to a voice mail system and embraces a method and system for providing an enhanced call answering service between a source telephone and a target telephone having access to a Value Added Service, optionally via an intermediate server.

It will also be understood that the voice mail system (or other Value Added Service) and the screening (or other intermediate) server according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method for providing a call answering service between a source telephone and a target telephone having access to a voice mail system, said method comprising:
   (a) receiving an unanswered call directed to the target telephone, said call having embedded therein an address of the target telephone, an address of the source telephone, an address of the voice mail system, and an indication as to whether or not the target telephone is busy;
   (b) if the target telephone is not busy, establishing an outgoing call to the target telephone;
   (c) conveying to the source telephone a response generated by the voice mail system, said response having embedded media parameters identifying the voice mail system; and
   (d) in response to an accept call instruction received from the target telephone, terminating said response and bridging all media between the source telephone and the target telephone, wherein at least one of the source and target telephones operates under VoIP.

2. The method according to claim 1, further including:
   (e) responsive to termination of a voice message directed from the source telephone, directing a prompt to the source telephone to allow the source telephone to hear the voice message.

3. A method for providing a call answering service between a source telephone and a target telephone having access to a screening server, said method comprising:
   (a) receiving an unanswered call directed to the target telephone, said call having embedded therein an address of the target telephone, an address of the source telephone, and an address of the screening server;
   (b) establishing an outgoing call to the target telephone;
   (c) establishing an outgoing call to a voice mail system and forwarding all call parameters that are needed by the voice mail system in order to process the call properly;
   (d) conveying to the source telephone a response generated by the voice mail system, said response having embedded media parameters identifying the screening server; and
   (e) in response to an accept call instruction received from the target telephone, terminating said response and re-establishing connection to both the source telephone and the target telephone.

4. A method for providing an enhanced call answering service between a source telephone and a target telephone having access to a Value Added Service, said method comprising:
   (a) receiving an unanswered call directed to the target telephone;
   (b) establishing to the Value Added Service an outgoing call containing an address of the target telephone, an address of the source telephone, and an address of the Value Added Service or of an intermediary associated therewith;
   (c) establishing an outgoing call to the target telephone;
   (d) conveying to the source telephone a response generated by the Value Added Service, said response having embedded media parameters identifying the Value Added Service or an intermediary associated therewith;
   (e) directing media received from the source telephone to the Value Added Service and directing media received from the Value Added Service or from an intermediary associated therewith to the source telephone;
   (f) upon the target telephone going off-hook, establishing a connection between the target telephone and the Value Added Service or the intermediary associated therewith so as to allow the target telephone to receive media conveyed from the source telephone to the Value Added Service or the intermediary associated therewith as well as media conveyed from the Value Added Service or the intermediary associated therewith to the source telephone; and
   (g) in response to an accept call instruction received from the target telephone, routing all media between the source telephone and the target telephone.

5. The method according to claim 4, wherein source telephone and the target telephone are VoIP telephones connected to the Value Added Service via said intermediary and there is further included:
   (h) in response to an accept call instruction received from the target telephone, disconnecting a connection to the Value Added Service.

6. The method according to claim 4, further including:
   (h) responsive to termination of a voice message directed from the source telephone, directing a prompt to the source telephone to allow the source telephone to hear the voice message; and
   (i) in response to a request from the target telephone to communicate with the source telephone, disconnecting the Value Added Service and bridging between the source telephone and the target telephone.

7. The method according to claim 4, wherein the Value Added Service is a voice mail system.

8. A program storage device readable by machine, tangibly embodying a program of instructions executable by the machine to perform a method for providing a call answering service between a source telephone and a target telephone having access to a voice mail system, said method comprising:
   (a) receiving an unanswered call directed to the target telephone, said call having embedded therein an address of the target telephone, an address of the source telephone, an address of the voice mail system, and an indication as to whether or not the target telephone is busy;
   (b) if the target telephone is not busy, establishing an outgoing call to the target telephone;

(c) conveying to the source telephone a response generated by the voice mail system, said response having embedded media parameters identifying the voice mail system; and (d) in response to an accept call instruction received from the target telephone, terminating said response and bridging all media between the source telephone and the target telephone, wherein at least one of the source and target telephones operates under VoIP.

9. A computer program product comprising a computer useable medium having computer readable program code embodied therein for providing a call answering service between a source telephone and a target telephone having access to a voice mail system, said computer program product comprising:

computer readable program code for causing the computer to receive an unanswered call directed to the target telephone, said call having embedded therein an address of the target telephone, an address of the source telephone, an address of the voice mail system, and an indication as to whether or not the target telephone is busy;

computer readable program code for causing the computer to establish an outgoing call to the target telephone if the target telephone is not busy;

computer readable program code for causing the computer to convey to the source telephone a response generated by the voice mail system, said response having embedded media parameters identifying the voice mail system; and computer readable program code for causing the computer to terminate said response and bridge all media between the source telephone and the target telephone in response to an accept call instruction received from the target telephone, wherein at least one of the source and target telephones operates under VoIP.

10. A program storage device readable by machine, tangibly embodying a program of instructions executable by the machine to perform a method for providing a call answering service between a source telephone and a target telephone having access to a screening server, said method comprising:

(a) receiving an unanswered call directed to the target telephone, said call having embedded therein an address of the target telephone, an address of the source telephone, and an address of the screening server;

(b) establishing an outgoing call to the target telephone;

(c) establishing an outgoing call to a voice mail system and forwarding all call parameters that are needed by the voice mail system in order to process the call properly;

(d) conveying to the source telephone a response generated by the voice mail system, said response having embedded media parameters identifying the screening server; and (e) in response to an accept call instruction received from the target telephone, terminating said response and re-establishing connection to both the source telephone and the target telephone.

11. A computer program product comprising a computer useable medium having computer readable program code embodied therein for providing a call answering service between a source telephone and a target telephone having access to a screening server, said computer program product comprising:

computer readable program code for causing the computer to receive an unanswered call directed to the target telephone, said call having embedded therein an address of the target telephone, an address of the source telephone, and an address of the screening server;

computer readable program code for causing the computer to establish an outgoing call to the target telephone;

computer readable program code for causing the computer to establish an outgoing call to a voice mail system and forwarding all call parameters that are needed by the voice mail system in order to process the call properly;

computer readable program code for causing the computer to convey to the source telephone a response generated by the voice mail system, said response having embedded media parameters identifying the screening server; and computer readable program code for causing the computer to terminate said response and re-establish connection to both the source telephone and the target telephone in response to an accept call instruction received from the target telephone.

12. A voice mail system for providing a call answering service between a source telephone and a target telephone having access to the voice mail system, said voice mail system being adapted to:

(a) receive an unanswered call directed to the target telephone, said call having embedded therein an address of the target telephone, an address of the source telephone, an address of the voice mail system, and an indication as to whether or not the target telephone is busy;

(b) establish an outgoing call to the target telephone if the target telephone is not busy;

(c) convey to the source telephone a response generated by the voice mail system, said response having embedded media parameters identifying the voice mail system; and (d) terminate said response and bridge all media between the source telephone and the target telephone in response to an accept call instruction received from the target telephone, wherein at least one of the source and target telephone operates under a VoIP.

13. The voice mail system according to claim 12, being further adapted to:

(e) direct a prompt to the source telephone to allow the source telephone to hear the voice message upon termination of a voice message directed from the source telephone.

14. A server for providing a service between a source telephone and a target telephone having access to the server, said server being adapted to:

(a) receive an unanswered call directed to the target telephone, said call having embedded therein an address of the target telephone, an address of the source telephone, and an address of the server;

(b) establish an outgoing call to the target telephone;

(c) establish an outgoing call to a Value Added System and forward all call parameters that are needed by the Value Added System in order to process the call properly;

(d) convey to the source telephone a response generated by the Value Added System, said response having embedded media parameters identifying the server; and (e) terminate said response and re-establish connection to both the source telephone and the target telephone in response to an accept call instruction received from the target telephone.

15. The server according to claim 14, wherein the Value Added System is voice mail system and the server is a screening server for screening calls directed to the voice mail system.

16. The method according to claim 1, wherein each of the source and target telephones operates under VoIP.

17. The method according to claim 8, wherein each of the source and target telephones operates under VoIiP.

18. The program product according to claim 9, wherein each of the source and target telephones operates under VoIP.

19. The voice mail system according to claim 12, wherein each of the source and target telephones operates under VoIP.

* * * * *